United States Patent Office 3,036,022
Patented May 22, 1962

3,036,022
PROCESS FOR THE PRODUCTION OF POLY-
URETHANE FOAMS
William J. Stewart, Mountain Lakes, and Theodore A. Girard, Wayne Township, Passaic County, N.J., assignors to Heyden Newport Chemical Corporation, New York, N.Y., a corporation of Delaware
No Drawing. Filed Mar. 31, 1961, Ser. No. 99,695
6 Claims. (Cl. 260—2.5)

This invention relates to a process for the production of polyurethane foams. More particularly, the invention relates to a process for producing polyurethane foams wherein a small amount of a novel catalyst is used to accelerate the reactions resulting in the formation of the foamed plastic products.

Polyurethane foams are well-known commercial products that are finding use in a number of applications. For example, these foams are being used in the manufacture of upholstery, mattresses, crash pads, clothing interliners and padding, rug underlay, sound insulation tile, and the like.

The preparation of polyurethane foams involves reactions between an organic polyisocyanate, a high molecular weight polyhydroxy compound, and water in the presence of catalysts. While polyesters have in the past been the polyhydroxy compounds used in the greatest quantity in the preparation of these foams, they have at the present time been largely replaced in this application by polyhydroxy polyethers, and particularly by polyethers having terminal secondary alcohol groups. This replacement has taken place principally because these polyethers are less expensive than the polyesters as well as less subject to hydrolytic instability. A further advantage is that the polyether-based foams can be prepared by the so-called "one-shot" method; that is, they can be prepared simply by mixing together and reacting all of the reactants simultaneously. The polyesters, on the other hand, are ordinarily reacted first with the isocyanate to form a prepolymer which is subsequently converted to a polyurethane foam. The one-shot process is generally preferred over the prepolymer process because it involves fewer reaction steps, because it forms a cured product more rapidly, and because it requires the use of less equipment. In addition the one-shot process can be used to form a product having an open-cell structure, thus eliminating the step ordinarily required in the prepolymer process in which the foam is crushed mechanically to rupture the cell walls before curing is complete.

In the one-shot process for the production of polyurethane foams, a high molecular weight polyether having terminal secondary alcohol groups is mixed with an organic polyisocyanate, water, catalyst, and various additives. The resulting mixture foams immediately and cures to a cross-linked product within a period of a few minutes. This process may be carried out conveniently in an apparatus such as that described in U.S. Patent 2,746,565 by introducing continuously into a mixing chamber streams of polyether, isocyanate, and a mixture comprising water, catalyst, and additives. The reaction mixture is then removed continuously to a mold where foaming is completed and the foamed resin is cured. This procedure may be used to prepare slab stock from which products may be cut, or it may be used to prepare molded products.

Numerous compounds have been proposed as catalysts for the reaction between the secondary alcohol groups of the polyether and the isocyanato groups to form polyurethane linkages. The most active of these have been organotin compounds, such as stannous octoate, stannous oleate, stannous 2-ethylhexoate, tetraphenyltin, dibutyltin diacetate, dibutyltin dichloride, and bis (2-ethylhexyl) tin dilaurate. While these organotin compounds are effective as catalysts for the condensation of the isocyanato groups with the secondary alcohol groups of the polyether, they are unsatisfactory as catalysts in the production of polyurethane foams for several important reasons. The dialkyl tin compounds, such as dibutyltin dilaurate, are not stable in the presence of oxygen or water. In addition foams prepared with these catalysts often show very poor thermal stability. The stannous soaps are readily oxidized to the corresponding stannic soaps and hydrolyzed to hydroxytin compounds. Since tin in its stannic state does not effectively catalyze the reaction between the isocyanates and the polyhydric polyethers, the utility of the soaps as condensation catalysts is dependent upon their stannous tin content. For this reason, the stannous soaps can be used in polyurethane foam formulations only when precautions are taken to insure the presence of an amount of stannous tin in the reaction mixture that is sufficient to catalyze the condensation. For example, it has been proposed that the stannous soap be added to the mixing chamber as a fourth stream, that is, separate from the isocyanate, polyether, and water streams. This procedure presents a difficult metering problem since it is necessary to measure accurately and add approximately 0.3 pound of the catalyst for each 140 pounds of the reactants. To avoid the mechanical difficulties involved in adding the catalyst as a separate stream, the soaps have been added to the stream containing water, surface-active agents, and other additives. Because of the tendency of the soaps to hydrolyze, such mixtures may be stored only for short periods of time. In addition the stannous soaps cause polymerization of the silicone fluids that are conventionally employed as surface-active agents in polyurethane foam formulations.

It has now been found that a novel tin compound, stannous quinolinolate, is an effective catalyst for the condensation of isocyanates with polyethers having terminal secondary alcohol groups which can be used in the manufacture of polyurethane foams by the one-shot procedure. Unlike the aforementioned organotin compounds, stannous quinolinolate is not readily oxidized or hydrolyzed, but rather retains its stannous tin content both when stored as an aqueous suspension for a week or longer and when heated in the presence of oxygen for a prolonged period. In addition this compound does not cause silicone fluids to polymerize. Because of its stability and its compatibility with silicone fluids, stannous quinolinolate can be used in the preparation of premixes of polyurethane foam ingredients that are stable for prolonged periods and that can be used after storage without loss of activity. Foams prepared with this catalyst are equivalent to those prepared with the aforementioned organotin compounds with respect to such physical properties as cell structure, foam density, compression set, load bearing characteristics, and tensile strength.

Stannous quinolinolate is a metal chelate which has the structure

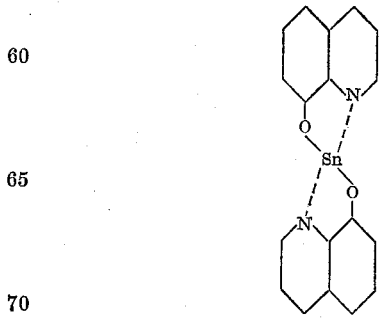

This chelate may be prepared by any convenient procedure. It may, for example, be prepared by the reaction of 8-hydroxyquinoline with a tin halide under alkaline conditions.

Stannous quinolinolate may be used in very small quantities as a catalyst in the preparation of polyurethane resins. In general, approximately 0.01% to 5.0%, and preferably approximately 0.1% to 1.0%, based on the total weight of the reactants, will suffice to bring about the desired catalytic effect.

The organic isocyanate used in the processes of this invention may be any of the polyisocyanates conventionally used for this purpose. These include, for example, aromatic, aliphatic, and cycloaliphatic diisocyanates. Among the specific compounds that may be used are toluene-2,4-diisocyanate, toluene-2,6-diisocyanate, m-phenylene diisocyanate, 4-chloro-1,3-phenylene diisocyanate, 4,4'-biphenyl diisocyanate, 1,5-naphthalene diisocyanate, 1,4-tetramethylene diisocyanate, 1,6-hexamethylene diisocyanate, 1,10-decamethylene diisocyanate, 1,4-cyclohexylene diisocyanate, 4,4'-methylene bis (cyclohexyl isocyanate), and 1,5-tetrahydronaphthalene diisocyanate. For purposes of the present invention, toluene-2,4-diisocyanate and mixtures of toluene-2,4- and -2,6-diisocyanates are the preferred polyisocyanates.

The polyethers used in the practice of the present invention are polyhydric polyalkylene polyethers which contain from 2 to 8 and preferably from 2 to 4 terminal secondary alcohol groups per molecule and which have molecular weights between 500 and 6000 and preferably between 2000 and 3500. These polyethers may be prepared by the polymerization of 1,2-propylene oxide or by the condensation of 1,2-propylene oxide with a polyhydric alcohol, such as propylene glycol, glycerol, trimethylolethane, trimethylolpropane, 1,2,6-hexanetriol, pentaerythritol, dipentaerythritol, and tripentaerythritol. This invention, however, is not restricted to the use of polyethers made by any particular method.

The amount of the isocyanate used is such that there is an excess of available isocyanato groups over the amount required to react with the hydroxyl groups available from the polyether and with the water. For most purposes 1.2 to 5 moles of polyisocyanate is used for each mole of the polyether. The preferred amount is 1.5 to 3 moles of polyisocyanate per mole of polyether.

One or more tertiary amines may be used in conjunction with the stannous quinolinolate catalyst. The tertiary amines have little catalytic action on the condensation between isocyanato groups and secondary alcohol groups to form polyurethane linkages, but they catalyze the reaction between the isocyanate and water to produce carbon dioxide and thereby effect foaming of the resin. Tertiary amines that are suitable for this purpose include triethylenediamine, triethylamine, N-alkylmorpholines, diethylcyclohexylamine, dimethylhexadecylamine, dimethylcetylamine, pyridine, quinoline, and 3-methylisoquinoline.

To facilitate mixing of the reactants and thereby to insure the formation of a uniform product, it is customary to utilize a surface-active agent in the production of polyurethane foams. Among the surface-active agents suitable for this use are high molecular weight alkyl and aryl sulfonates, high molecular weight alkyl sulfates, silicone fluid, and soaps. We prefer to use a surface-active silicone fluid in the amount of 0.1% to 10% based on the weight of the polyether.

As has been indicated, water is conventionally used in polyurethane foam formulations to generate the carbon dioxide gas which causes the liquid reaction mixture to expand and foam. The amount of water employed is approximately 0.5% to 10% based on the weight of the polyether.

In addition to the aforementioned ingredients, the reaction mixture may contain plasticizers, fillers, reinforcing agents, blowing agents, coloring agents, solvents, antioxidants, and other additives in the amounts ordinarily employed for the purposes indicated.

In the production of polyurethane foams by the process of the present invention, the condensation of the isocyanate with the polyether and water is usually carried out by introducing continuously into a mixing chamber streams of the isocyanate, the polyether, and a mixture containing water, stannous quinolinolate, silicone fluid, and other additives and then discharging the resultant product while it is still in the liquid state into a mold wherein foaming is completed and curing takes place. Alternatively, the novel catalyst may be added to the reaction mixture as a dispersion in the polyether. Both the water-catalyst premix and the polyether-catalyst premix are stable and can be stored for a number of days without loss of activity.

The invention is further illustrated by the examples that follow. It is to be understood, however, that these examples are not to be construed as being limitative but are furnished merely for purposes of illustration.

*Example 1*

To a mixture of 2700 grams of water and 308.2 grams of a 25.5% aqueous sodium hydroxide solution at 88°–90° C. was added 285.2 grams of 8-hydroxyquinoline. Then while the solution was being agitated at 88°–90° C., 186.5 grams of tin chloride was added to it over a period of 20 minutes. The mixture was agitated for 15 minutes and then filtered. The yellow precipitate was washed with three 3000 ml. portions of water and then dried at 82° C. to constant weight. The stannous quinolinolate, which melted at 225°–229° C. with decomposition, contained 29.1% Sn.

*Example 2*

To demonstrate its resistance to oxidation, the product of Example 1 was heated at 82° C. for 16 hours with free access of air. At the end of this time, the product contained 29.0% of stannous tin, thus indicating that substantially no oxidation of tin from the stannous to the stannic state had occurred during the prolonged heating period.

*Example 3*

The stability of stannous quinolinolate in the presence of the reactants used in the production of polyurethane foams was demonstrated by forming premixes containing the catalyst and one or more of the reactants and additives in the relative amounts in which they are ordinarily used and determining the maximum period that the premix could be stored before its ability to form a high quality foam was affected. For comparative purposes a similar series of tests was carried out using stannous octoate as the catalyst. The results of these stability tests may be summarized as follows:

| Premix | | Maximum Safe Storage Time |
| --- | --- | --- |
| Reactants and Additives | Catalyst | |
| Silicone oil | Stannous quinolinolate | >20 days. |
| Do | Stannous octoate | <1 day. |
| Polyether | Stannous quinolinolate | 10 days. |
| Water and tertiary amines | do | 9 days. |
| Do | Stannous octoate | 8 hours. |
| Polyether, water, silicone oil, and tertiary amines. | Stannous quinolinolate | 7 days. |
| Do | Stannous octoate | 1 day. |

From the foregoing data it will be observed that premixes containing stannous quinolinolate and one or more of the polyurethane foam ingredients are far more stable on storage than are the comparable premixes which contain stannous octoate.

*Example 4*

To a mixture containing 3 grams of water, 0.5 gram of N-ethylmorpholine, 0.1 gram of triethylenediamine, 1 gram of silicone oil (Silicone X–520, which is manufactured by Union Carbide Silicones Division, Union Carbide and Chemicals Corp.), and 0.4 gram of stannous quinolinolate was added 100 grams of a polyoxypropylene triol which is a propylene oxide-glycerol adduct having an average hydroxyl number of 56 and an average molecular weight of 3000 (Niax Triol LG-56, which is manufactured by Union Carbide and Chemicals Corp.). Then 38 grams of toluene diisocyanate (80% 2,4-isomer; 20% 2,6-isomer) was added to this mixture. The resulting mixture was stirred for 30 seconds and poured into a mold. The resin foamed immediately and cured within a period of several minutes to form a low density resilient foam.

*Example 5*

For comparative purposes, the experiment of Example 4 was repeated using 0.5 gram of stannous octoate instead of the stannous quinolinolate. The product obtained was similar to the product of Example 4 in foam density, cell structure, and appearance. The stannous quinolinolate-catalyzed foam was softer than the stannous octoate-catalyzed foam and had better rebound characteristics.

*Example 6*

The procedure described in Example 4 was repeated except that the triethylenediamine and N-ethylmorpholine were omitted from the formulation. The reaction mixture foamed and cured to form a product similar in physical properties to the product of Example 4.

*Example 7*

The procedure described in Example 4 was repeated except that stannous quinolinolate was omitted from the formulation. The reaction mixture foamed satisfactorily, but the foam collapsed shortly after its formation. Cross-linking and curing of the foamed resin did not take place in the absence of a tin catalyst.

*Example 8*

The following formulation was used in the preparation of a polyurethane foam by the one-shot method:

| | Parts by weight |
|---|---|
| Polyoxypropylene polyether triol (molecular weight, 3000) | 75 |
| Polyoxypropylene polyether diol (molecular weight, 2000) | 25 |
| Stannous quinolinolate | 0.5 |
| Triethylamine | 0.3 |
| Triethylenediamine | 0.05 |
| Silicone oil (Silicone L-520, Union Carbide Silicones Division) | 1.5 |
| Fluorotrichloromethane (Genetron 11, General Chemical Division, Allied Chemical Corp.) | 7.5 |
| Water | 3.5 |
| Toluene diisocyanate (80% 2,4-isomer; 20% 2,6-isomer) | 45 |

The product was a soft, resilient, low density foam.

The foams described in the foregoing examples are relatively flexible in character. More rigid foams may be prepared in a similar manner by using the more highly functional polyethers and/or by increasing the isocyanate content of the resins.

While stannous quinolinolate has been described herein as a catalyst for the preparation of polyurethane foams, its use as a catalyst is not restricted to the production of foamed resins. It can also be used to catalyze the reaction of isocyanates with polyhydric polyethers in the absence of water to form polyurethane resins that are useful in surface coating compositions. Coatings prepared from these resins are characterized by excellent resistance to water and to chemicals, abrasion resistance, and flexibility.

We claim:

1. In the process for the production of polyurethane resins which comprises reacting an organic diisocyanate and a polyhydric polyalkylene polyether, said ether containing from 2 to 8 secondary alcohol groups per molecule and having a molecular weight between 500 and 6000, the improvement which comprises effecting said reaction while the said reactants are in admixture with a catalytic amount of stannous quinolinolate.

2. In the process for the production of polyurethane resins which comprises reacting an organic diisocyanate and a polyhydric polyalkylene polyether, said ether containing from 2 to 4 secondary alcohol groups per molecule and having a molecular weight between 2000 and 3500, the improvement which comprises effecting said reaction while the said reactants are in admixture with approximately 0.01% to 5.0% of stannous quinolinolate.

3. In the process for the production of polyurethane foams which comprises reacting an organic polyisocyanate, water, and a polyhydric polyalkylene polyether, said ether containing from 2 to 8 secondary alcohol groups per molecule and having a molecular weight between 500 and 6000, the improvement which comprises including in the reaction mixture a catalytic amount of stannous quinolinolate.

4. In the process for the production of polyurethane foams which comprises reacting an organic polyisocyanate, water, and a polyhydric polyalkylene polyether, said ether containing from 2 to 4 secondary alcohol groups per molecule and having a molecular weight between 2000 and 3500, the improvement which comprises including in the reaction mixture a catalytic amount of stannous quinolinolate.

5. The process of claim 4 wherein the reaction mixture contains approximately 0.01% to 5.0% of stannous quinolinolate.

6. The process of claim 4 wherein the reaction mixture contains approximately 0.1% to 1.0% of stannous quinolinolate.

References Cited in the file of this patent

UNITED STATES PATENTS

| 2,948,691 | Windemuth et al. | Aug. 9, 1960 |

FOREIGN PATENTS

| 1,212,252 | France | Oct. 19, 1959 |

OTHER REFERENCES

Martell: "Chemistry of the Metal Chelate Compounds," Pub. by Prentice-Hall Inc., New York.

Moeller: "Ind. and Eng. Chem. Annal Ed.," volume 15, pages 270–272 (1943).